(12) United States Patent
Lee et al.

(10) Patent No.: US 11,614,086 B2
(45) Date of Patent: Mar. 28, 2023

(54) FLYWHEEL ASSISTED ROTARY COMPRESSORS

(71) Applicant: ASPEN COMPRESSOR, LLC, Marlborough, MA (US)

(72) Inventors: Kang P. Lee, Sudbury, MA (US); Douglas S. Olsen, Natick, MA (US)

(73) Assignee: ASPEN COMPRESSOR, LLC, Marlborough, MA (US)

(*) Notice: Subject to any disclaimer, the term of this patent is extended or adjusted under 35 U.S.C. 154(b) by 717 days.

(21) Appl. No.: 16/474,709

(22) PCT Filed: Dec. 29, 2017

(86) PCT No.: PCT/US2017/069087
§ 371 (c)(1),
(2) Date: Jun. 28, 2019

(87) PCT Pub. No.: WO2018/126208
PCT Pub. Date: Jul. 5, 2018

(65) Prior Publication Data
US 2019/0338772 A1   Nov. 7, 2019

Related U.S. Application Data

(60) Provisional application No. 62/440,468, filed on Dec. 30, 2016.

(51) Int. Cl.
*F04C 15/00* (2006.01)
*F04C 2/00* (2006.01)
(Continued)

(52) U.S. Cl.
CPC ............ *F04C 15/0061* (2013.01); *F04C 2/00* (2013.01); *H02K 7/02* (2013.01); *F04C 13/001* (2013.01); *F04C 2240/40* (2013.01); *H02K 29/03* (2013.01)

(58) Field of Classification Search
CPC ......... F04C 2/00; F04C 2270/12; H02K 7/02; F16C 2361/55; F16F 15/00
See application file for complete search history.

(56) References Cited

U.S. PATENT DOCUMENTS 2,031,940 A    2/1936   Drysdale
3,585,874 A *  6/1971   Ingham ................. F16H 55/084
                                              74/393
(Continued)

FOREIGN PATENT DOCUMENTS

CN    1498311 A    5/2004
CN    1629478 A    6/2005
(Continued)

OTHER PUBLICATIONS

International Search Report and Written Opinion for International Application No. PCT/US2014/067933 dated Apr. 23, 2015.
(Continued)

*Primary Examiner* — Kenneth J Hansen
(74) *Attorney, Agent, or Firm* — Wolf, Greenfield & Sacks, P.C.

(57) ABSTRACT

Aspects described herein relate generally to rotary compressors that incorporate a flywheel within to significantly reduce the compressor vibration and drive torque ripples as well as to achieve a higher overall electro-mechanical efficiency and potentially lower combined costs of BLDC rotary compressors and their drive electronics.

7 Claims, 10 Drawing Sheets

(51) Int. Cl.
*H02K 7/02* (2006.01)
*F04C 13/00* (2006.01)
*H02K 29/03* (2006.01)

(56) References Cited

U.S. PATENT DOCUMENTS

| | | | |
|---|---|---|---|
| 4,566,865 | A | 1/1986 | Nishitsuji et al. |
| 5,498,143 | A | 3/1996 | Dreiman et al. |
| 5,965,966 | A | 10/1999 | Aiello et al. |
| 6,190,144 | B1 | 2/2001 | Balma |
| 6,361,293 | B1 | 3/2002 | Harper et al. |
| 6,930,416 | B1 | 8/2005 | Remington et al. |
| 10,670,017 | B2 | 6/2020 | Lee et al. |
| 2002/0067998 | A1 | 6/2002 | Narney, II et al. |
| 2003/0223895 | A1 | 12/2003 | Lee |
| 2004/0071568 | A1 | 4/2004 | Hyeon |
| 2004/0184922 | A1* | 9/2004 | Cho ............... F04C 28/26 417/326 |
| 2005/0152792 | A1 | 7/2005 | Ogasawara et al. |
| 2006/0103252 | A1 | 5/2006 | Yokota |
| 2006/0216165 | A1 | 9/2006 | Lee |
| 2008/0292484 | A1 | 11/2008 | Suh et al. |
| 2009/0180907 | A1 | 7/2009 | Udea et al. |
| 2010/0166577 | A1 | 7/2010 | Higuchi et al. |
| 2011/0243779 | A1 | 10/2011 | Masuda |
| 2011/0293445 | A1 | 12/2011 | An et al. |
| 2012/0171067 | A1 | 7/2012 | Lee et al. |
| 2012/0183422 | A1 | 7/2012 | Bahmata |
| 2013/0052056 | A1* | 2/2013 | Kim ............... F04B 35/04 417/410.1 |
| 2013/0078123 | A1 | 3/2013 | Fukasaku et al. |
| 2013/0129539 | A1 | 5/2013 | Lee |
| 2013/0209287 | A1 | 8/2013 | Kobori et al. |
| 2014/0180483 | A1 | 6/2014 | Cheng et al. |
| 2016/0001624 | A1 | 1/2016 | Meissner et al. |
| 2016/0025094 | A1 | 1/2016 | Ignatiev et al. |
| 2016/0305431 | A1 | 10/2016 | Lee et al. |
| 2018/0216609 | A1* | 8/2018 | Kawano ............... F04B 41/02 |
| 2020/0300247 | A1 | 9/2020 | Lee et al. |

FOREIGN PATENT DOCUMENTS

| | | |
|---|---|---|
| CN | 200985884 Y | 12/2007 |
| CN | 201771770 U | 3/2011 |
| CN | 102257278 A | 11/2011 |
| CN | 102261334 A | 11/2011 |
| CN | 103237990 A | 8/2013 |
| CN | 203516007 U | 4/2014 |
| EP | 2330301 A1 | 6/2011 |
| KR | 10-1999-0030635 | 5/1999 |
| KR | 10-2003-0092714 A | 12/2003 |
| KR | 10-2004-0090848 A | 10/2004 |
| KR | 10-2013-0055407 A | 5/2013 |

OTHER PUBLICATIONS

International Preliminary Report on Patentability for International Application No. PCT/US2014/067933 dated Jun. 16, 2016.
International Search Report and Written Opinion for International Application No. PCT/US2017/069087 dated Feb. 26, 2018.
International Preliminary Report on Patentability for International Application No. PCT/US2017/069087 dated Jul. 11, 2019.
Chinese Office Action in connection with Chinese Application No. 201780087617.3, dated Sep. 3, 2020.
U.S. Appl. No. 16/889,055, filed Jun. 1, 2020, Lee et al.
CN 201780087617.3, Sep. 3, 2020, Chinese Office Action.

* cited by examiner

FLYWHEEL ASSISTED ROTARY COMPRESSORS

RELATED APPLICATION

This application is a national stage filing under 35 U.S.C. § 371 of International Application No. PCT/2017/069087, filed on Dec. 29, 2017, entitled "FLYWHEEL ASSISTED ROTARY COMPRESSORS," which claims the benefit of and priority under 35 U.S.C. § 119(e) to U.S. Provisional Patent Application Serial No. 62/440,468, filed on Dec. 30, 2016, entitled "FLYWHEEL ASSISTED ROTARY COMPRESSORS." The entire contents of these applications are incorporated herein by reference in their entirety.

BACKGROUND

1. Field

Aspects described herein relate generally to rotary compressors including a flywheel.

2. Discussion of Related Art

Rotary compressors may be used for a number of applications. For example, rotary compressors may be used as gas compressors, or incorporated within cooling systems such as refrigerators, countertop beverage dispensers, freezers, coolers and air conditioners for automobiles, buses, trucks and ships. Rotary compressors come in a number of configurations, for example, rolling piston compressor, rotary vane compressors, scroll compressors, screw compressors, Wankel compressors, centrifugal compressors, and swing compressors.

Rotating vane compressors typically include a roller with a number of blades associated with radial slots of the roller. The roller is mounted so as to be offset with the overall housing such that when the rotor turns, the vanes create a series of continuously changing volumes. Rolling piston compressors have one vane that shuttles back and forth in a vane slot provided in the cylinder as the roller rolls around the inner surface of the cylinder while maintaining the contact with the roller. Rotary scroll compressors include interleaving scrolls where one of the scrolls orbits the other eccentrically without rotating, causing fluid to be trapped and compressed between the scrolls. Rotary screw compressors employ helical screw rotors enmeshed together to force fluid through the compressor. Centrifugal compressors create a pressure differential by using a rotor or impeller to add kinetic energy to a continuous flow of fluid. This kinetic energy is converted to potential energy by slowing the flow through a diffuser. A swing compressor is a variation of a rolling piston compressor with an integrated vane-roller assembly that swings during compressor cycle instead of shuttling a vane in a vane slot against a rolling roller-piston.

SUMMARY

In one embodiment, a rotary compressor includes a motor having a rotor and a stator electromagnetically coupled to one another, with the rotor rotatable relative to the stator. The compressor further includes a compressor cylinder, a shaft rotatably coupled to the rotor and extending through the compressor cylinder, and a flywheel coupled to the rotor. Rotation of the rotor drives rotation of the shaft within the compressor cylinder.

In another embodiment, a rotary compressor includes a motor having a rotor and a stator electromagnetically coupled to one another. The rotor at least partially surrounds the stator and is rotatable relative to the stator. The compressor further includes a compressor cylinder and a shaft rotatably coupled to the rotor and extending through the compressor cylinder. Rotation of the rotor drives rotation of the shaft within the compressor cylinder.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
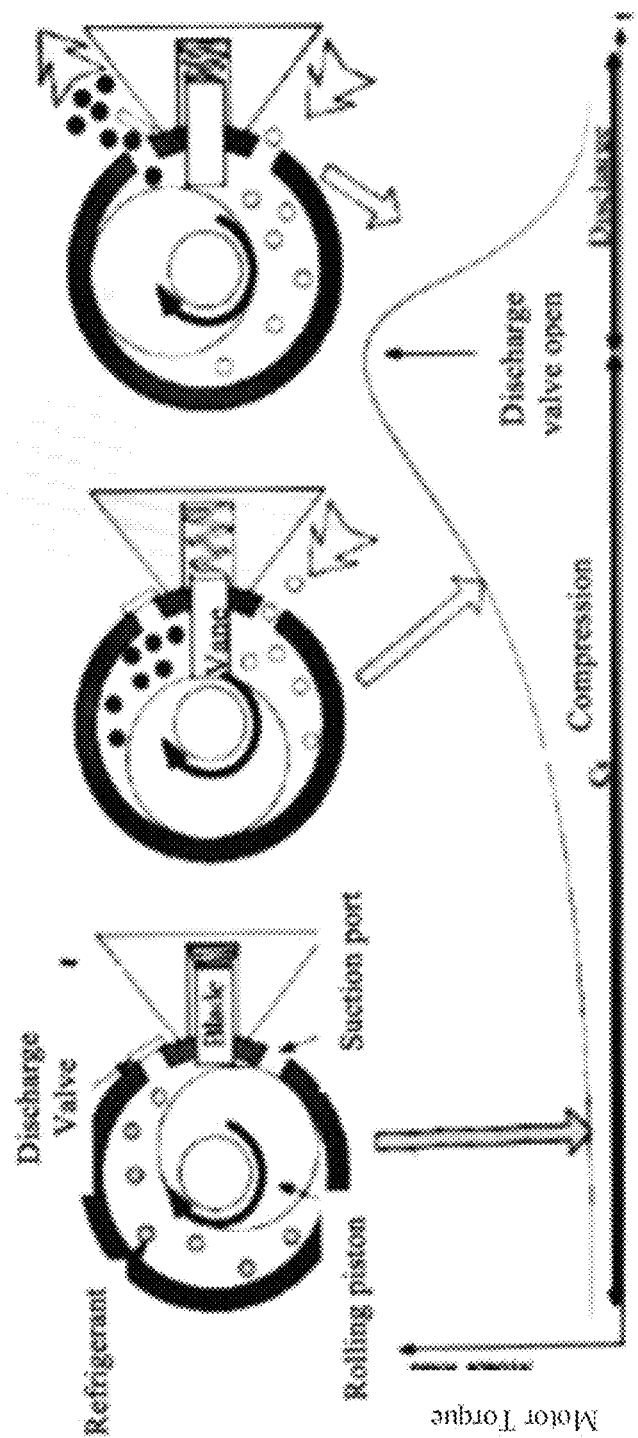
FIG. 1 is a schematic illustration of the operation of a single cylinder rotary compressor as well as the associated torque variations.

The inventors have appreciated that conventional rotary compressors may suffer from excess vibration and/or noise during operation. Additionally, efforts to reduce or mitigate the vibration and noise have typically involved complex compressor designs such as twin cylinder rotary compressors, or have necessitate the use of expensive and complex BLDC motor control electronics. In view of the above, the inventors have recognized numerous advantages associated with rotary compressors that can reduce the undesirable noise and vibration while not driving up the manufacturing cost of the compressor. According to some aspects of the current disclosure, a rotary compressor includes a flywheel within the compressor, which may significantly reduce the compressor vibration and drive torque ripple amplitudes as well as achieve a higher overall electro-mechanical efficiency and potentially lower combined costs of brushless direct current (BLDC) rotary compressors and their drive electronics.

In conventional rotary compressors, the internal components are encased in a tight a housing. The relatively high noise and vibration levels of single cylinder rotary compressors traditionally has been a major obstacle to much wider usages for these highly compact, reliable and efficient compressors. For example, it would be highly advantageous to use a compact and efficient rotary compressor rather than a bulky and far less efficient reciprocating compressor in a household refrigerator. In addition, a rolling piston compressor, by its configuration with the compression space being formed between the roller and the inner diameter of the cylinder, has an inherently higher thermal efficiency than reciprocating or linear compressors. This is primarily due to the fact that rotary compression chambers are shaped in such a way to cause far less cyclic heat transfer between the gas and the chamber wall per cycle, which heat transfer generates entropy in accordance with the Second Law of Thermodynamics thus causing inevitable and irreversible loss of energy leading to lower compressor thermodynamic efficiency. Therefore, rotary compressors have the inherent advantages of being more compact, reliable and efficient than reciprocating or linear compressors.

However, there are disadvantages of conventional rotary compressors compared to reciprocating compressors. For example, rotary compressors typically have a higher cost, and especially in the case of single cylinder rotary compressors, relatively high vibration and high noise. These latter two disadvantages can be mitigated by using a twin cylinder configuration, however, using a twin cylinder compressor adds to the higher cost problem. These disadvantages have traditionally limited rotary compressors from being more widely used in household applications (e.g., in refrigerators) and other large-scale applications. In addition to reducing the high cost, effective reduction in vibration and the associated noise of a rotary compressor over a wide operating range has been a highly desired yet unfulfilled and neglected target for the world's rotary compressor industry for several decades ever since its introduction.

Rotary compressors, as described herein, may include compressors that are configured to compress fluid (e.g., gas, vapor) by rotary motion of a pump driven by a rotor. In some embodiments, rotary motion may be achieved in cooperation with a roller and a vane inside a cylinder, for example, including one of a rolling piston compressor, a rotating vane compressor, a scroll compressor, a rotary screw compressor, swing piston compressor, etc., including single and twin cylinder (e.g., having a mid-plate that separates two cylinders running on a single shaft with two eccentric parts 180 degrees out of phase with each other), as known to those of skill in the art. Various embodiments of rotary compressors may include a suitable motor and pump. The motor may include a rotor and a stator, coupled (e.g., electromagnetically) to each another. The pump may include top and bottom flanges, a cylinder, a vane, a roller, a shaft, a motor rotor, etc., as discussed further below.

The general torque requirement of a single cylinder rotary compressor during suction, compression, discharge and re-expansion processes without the higher frequency ripples is depicted in FIG. 1. During suction, a low level motor torque is required to overcome the friction in the bearings and suction pressure drop. During the compression process, the torque steadily increases to the peak value above the discharge pressure to open the discharge valve. During discharge process, the torque decreases rapidly to the low level as the compressed gas exits into the case at discharge pressure. During the short re-expansion process that follows the discharge process, the high-pressure gas trapped in the clearance volume rapidly expands into the suction chamber formed by the rotation of the roller, and the torque remains low. This idealized torque variation during each cycle as shown in FIG. 1 calls for corresponding rapid changes in electrical current supplied to the motor to match the torque required instantaneously.

The high amplitude torque variations of single cylinder rotary compressors noted above are mostly caused by the gas pressure variations over each cycle. These torque variations create speed variations in the motor as well as dynamic imbalances in the compressor's rotating components and bearings, which may generate undesired levels of mechanically induced noise and vibration. The torque variations also cause lower electrical efficiency for the motor, even when sophisticated and expensive modern BLDC drives are used to control the motor. Moreover, the pressure variation induced vibrations in the pump assembly get transmitted to the case of the compressor via the compressor structure, and also through the gas medium to the compressor case and then to the surroundings.

In addition to the above described pressure and torque fluctuations, if the vane of a rotary compressor is chattering and therefore not always in contact with the roller, which may happen if speed gets too high, the pressure difference is too high, or if the vane spring and mass are not correctly designed to cover the range of operational conditions, there may be intermittent cross-flows between the high pressure side and the low pressure side of the rotary compressor. This may result in high frequency fluctuations in the pressures in the compressor and the torque required by the compressor superimposed onto the torque profile illustrated in FIG. 1 over the course of a cycle. Similarly, if the valve chatters rapidly during opening and closing for any reason, this may also cause high frequency fluctuations in the pressures inside the compressor and affect the instantaneous torque required by the compressor to be superimposed to the torque profile illustrated in FIG. 1.

Moreover, the above described phenomena may become exacerbated as the speed of a single cylinder BLDC rotary compressor increases, say from 60 Hz to 100 Hz. Regardless of their origins or causes, all these torque ripples tend to cause increases in noise and vibration and reduction in electrical and mechanical efficiency of a BLDC rotary compressor.

Of the various rotary compressor configurations, single cylinder versions of rolling piston compressors and swing compressors typically experience high amplitude motor torque peaks during each cycle as a result of the fluid suction, compression, discharge and re-expansion processes of the compressor (see FIG. 1). With higher and sharper peaks, it becomes more difficult to provide the necessary motor torque to instantaneously match the pressure load peaks in the compressor. Despite the best torque-following algorithms used in modern BLDC drive electronics to provide the instantaneously changing current to the motor to handle the rapidly varying torque requirements during each compressor cycle, there are inevitable torque mismatches (resulting in undesirable net torque ripples) between the instantaneous torque requirements of the compressor and what the BLDC motor can instantaneously provide through the BLDC drive electronics. Even if the torque matching could be accomplished flawlessly in a hypothetical case, single cylinder rotary compressors are still left with relatively high amplitude rotational vibration of the compressor itself due to the rapidly changing pressure loads that have equal and opposite reactions to the entire compressor mass. As discussed in more detail below, according to some aspects of the current disclosure, a single or twin cylinder compressor may include a flywheel (or include one or more components which function as a flywheel) to mitigate some or all of these effects.

In a single cylinder BLDC rotary compressor, the BLDC drive electronics are used to match the rapidly changing load of a compressor over the course of each cycle by supplying an appropriate current to the motor. If the speed of the compressor is slow enough for the BLDC drive electronics and the motor to respond to, the load following characteristics of the BLDC motor of the rotary compressor can be reasonably accurate and the BLDC drive-motor efficiency can be maintained relatively high. However, if the speed of the compressor is too slow for a sensorless drive electronics system to detect a back emf, the sensorless BLDC drive does not work well. If the speed is too fast, resulting in too sharp changes in torque for the BLDC drive/motor system to fully follow (e.g., due to inevitable delays in the electrical as well as the mechanical components) there tend to be instantaneous under-supply or over-supply of current to the BLDC motor resulting in higher noise and vibration of the compressor along with lower electrical-to-mechanical power conversion factor.

The BLDC drive electronics senses the speed variations of the motor and calculates and tries to supply the required current to the motor as accurately as it can to maintain the speed of the rotation. The task of supplying the accurate level of current to the motor winding to match the instantaneous torque needed for the compressor becomes more difficult if there are superimposed higher frequency torque ripples due to causes mentioned above.

Additionally, the inventors have appreciated that the torque matching between what is needed by the compressor to execute the compressor cycles and what is provided by the motor at each instant is not perfect due to inevitable delays in computations and in the electrical circuits. This becomes increasingly pronounced at higher speeds resulting in higher electrical noise and as well as acoustic noise and vibrations. Moreover, even if the torque matching were to be done perfectly within each compressor cycle, there would still be low frequency vibration related to the rotational speed of the compressor, thus leading to noise from the compressor and the system containing the compressor because of the inherently unevenly applied torque inside the compressor to execute the four compressor cycles. In short, single cylinder rotary compressors inherently have much higher vibration and noise levels even with sophisticated BLDC drive electronics.

Because of the requirements of accurate matching of the torque that abruptly changes in amplitudes during each of the four compressor cycles, the BLDC drive electronics for conventional BLDC rotary compressors requires complicated firmware and/or hardware, which may make the BLDC motor more costly. For example, the drive electronics may require expensive components such as capacitors, FETs, microprocessors, etc. that are needed for high speed sensing of the speed and location of the rotor, frequency switching, and calculating and supplying rapidly varying currents to match the compressor torque requirements. As a result, the BLDC drive electronics becomes a large part of the cost of a rotary compressor.

Accordingly, the relatively high noise and vibration levels and relatively high cost of the BLDC drive electronics for the conventional BLDC rotary compressors are major reasons that BLDC rotary compressors have not been widely used, like the ubiquitous, low cost and low efficiency AC driven fixed speed reciprocating compressors used in household refrigerators despite many advantages of BLDC compressors, such as much higher efficiency and compactness.

In view of the above, the inventors have recognized numerous benefits associated with rotary compressors that can achieve much lower vibration and lower noise while maintaining a low cost and in some cases avoiding the need for complex (and costly) BLDC drive electronics. According to some aspects of the current disclosure, the inventors have recognized and appreciated that by including a flywheel within a compressor (e.g., mounted on the motor shaft or on the rotor), the torque and speed variations in the compressor may be smoothed. For example, the flywheel may have sufficient kinetic energy stored in its rotational motion to smooth over the rotational motion of the compressor parts. Moreover, since a flywheel may be able to store a large multiple of the input energy per cycle, it may allow the compressor to run at a nearly constant speed despite receiving a non-uniform load from the motor. Additionally, the inventors have appreciated that since rotary compressors can run at very high speeds, even a relatively small flywheel that can fit inside a compact rotary compressor may add sufficient moment of inertia and/or kinetic energy to provide the above-noted benefits.

According to some embodiments, including a flywheel within a compressor may help to address major sources of vibration in rotary compressors, such as vibrations in the pump assembly and vibration of the motor. For example, a flywheel with an adequate size and shape may add sufficient moment of inertia to the rotating components of the compressor and may store sufficient kinetic energy to act as a buffer between the motor and the compressor. This may aid in reducing vibration arising from load torque variation during normal compressor cycles, motor cogging, as well as instantaneous mismatch between the load torque required by the by the pump assembly and drive torque associated with the current supplied by BLDC drive electronics and transmitted to the pump assembly, or other vibration sources.

Figure 4:
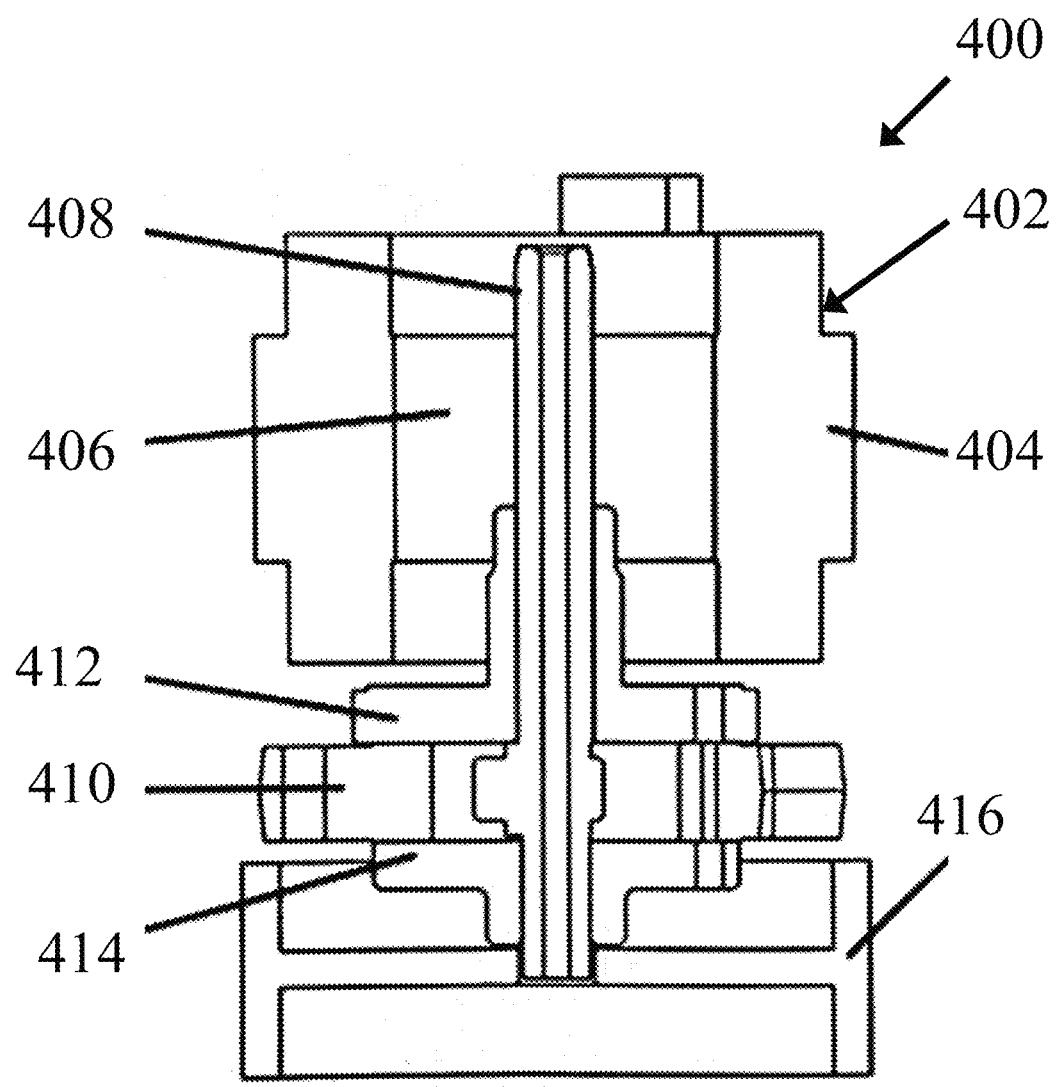
FIG. 4 is a schematic representation of a rotary compressor according to some embodiments.

FIG. 4 depicts one embodiment of a rotary compressor 400. The compressor includes a motor 402 including a stator 404 and a rotor 406 electromagnetically coupled to the stator. A shaft 408 is coupled to the rotor such that rotation of the rotor drives rotation of the shaft. For example, the shaft and rotor may be directly coupled to one another (e.g., via one or more fasteners, adhesives, welded joints, etc.) or the shaft and rotor may be formed as an integral component to directly couple the shaft and rotor. In other embodiments, the shaft and rotor may be indirectly coupled to one another (e.g., via a suitable linkage). The shaft 408 extends through a compressor cylinder 410, as well as an upper flange 412 and lower flange 414 attached to the top and bottom of the cylinder 410, respectively. A flywheel 416 is coupled to the shaft 408 such that rotation of the shaft drives rotation of the flywheel. In this embodiment, the flywheel 416 is located beneath the lower flange, and accordingly the shaft 408 extends below the lower flange to attach to a hub of the flywheel. In some embodiments, such a configuration may result in the flywheel being exposed to an oil sump of the compressor (not depicted). In such embodiments, the flywheel may be covered to avoid viscous loss and/or foaming.

Figure 5:
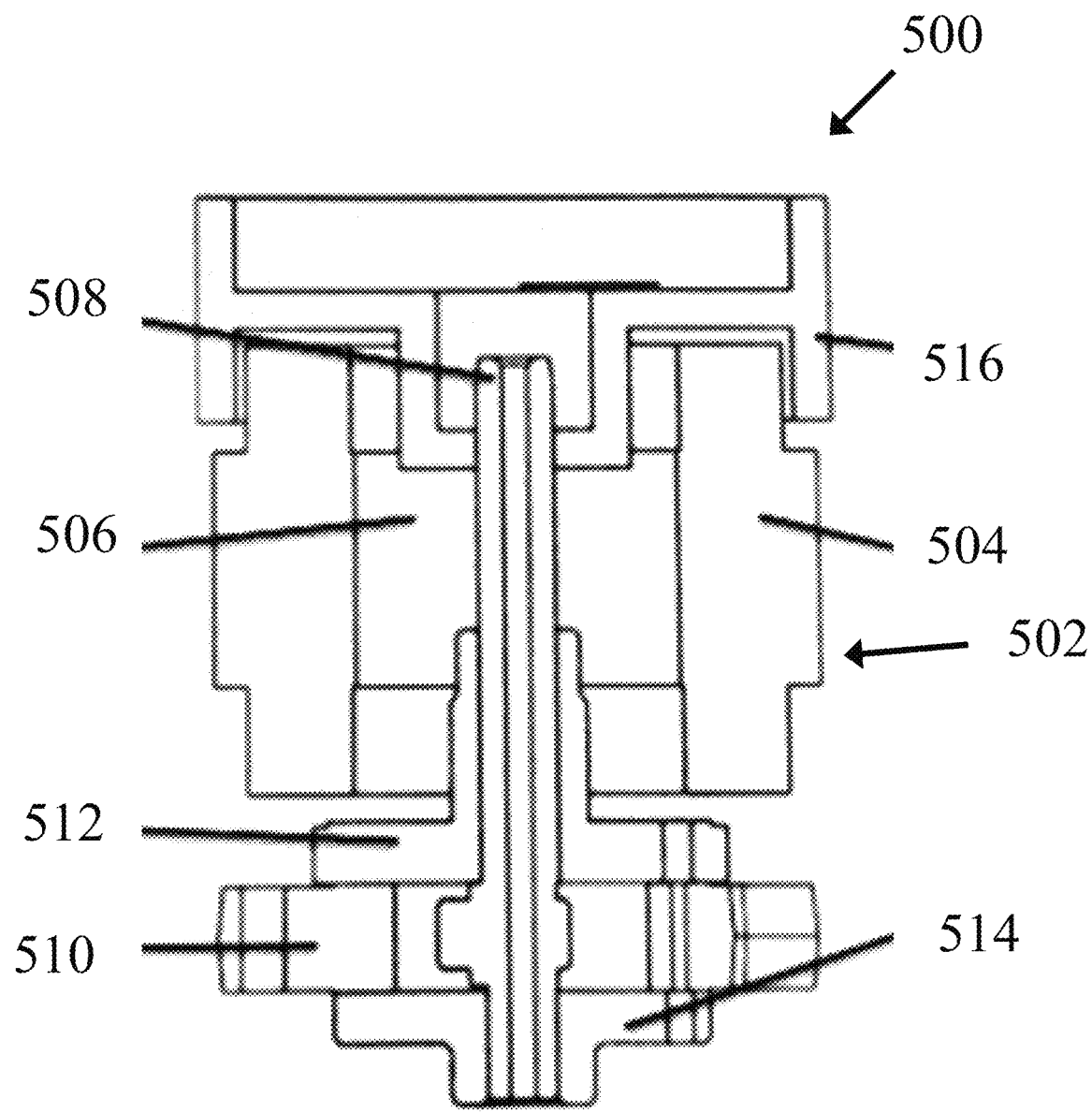
FIG. 5 is a schematic representation of a rotary compressor according to some embodiments.

FIG. 5 depicts another embodiment of a rotary compressor 500. Similar to the embodiment described above in connection with FIG. 4, the compressor includes a motor 502 including a stator 504 and a rotor 506 electromagnetically coupled to the stator. A shaft 508 is coupled to the rotor 506 and extends through a compressor cylinder 510, as well as upper and lower flanges 512 and 514 attached to the cylinder 510. In this embodiment, a flywheel 516 is coupled to the rotor 508 and is positioned on top of the motor above the motor 502.

Figure 6:
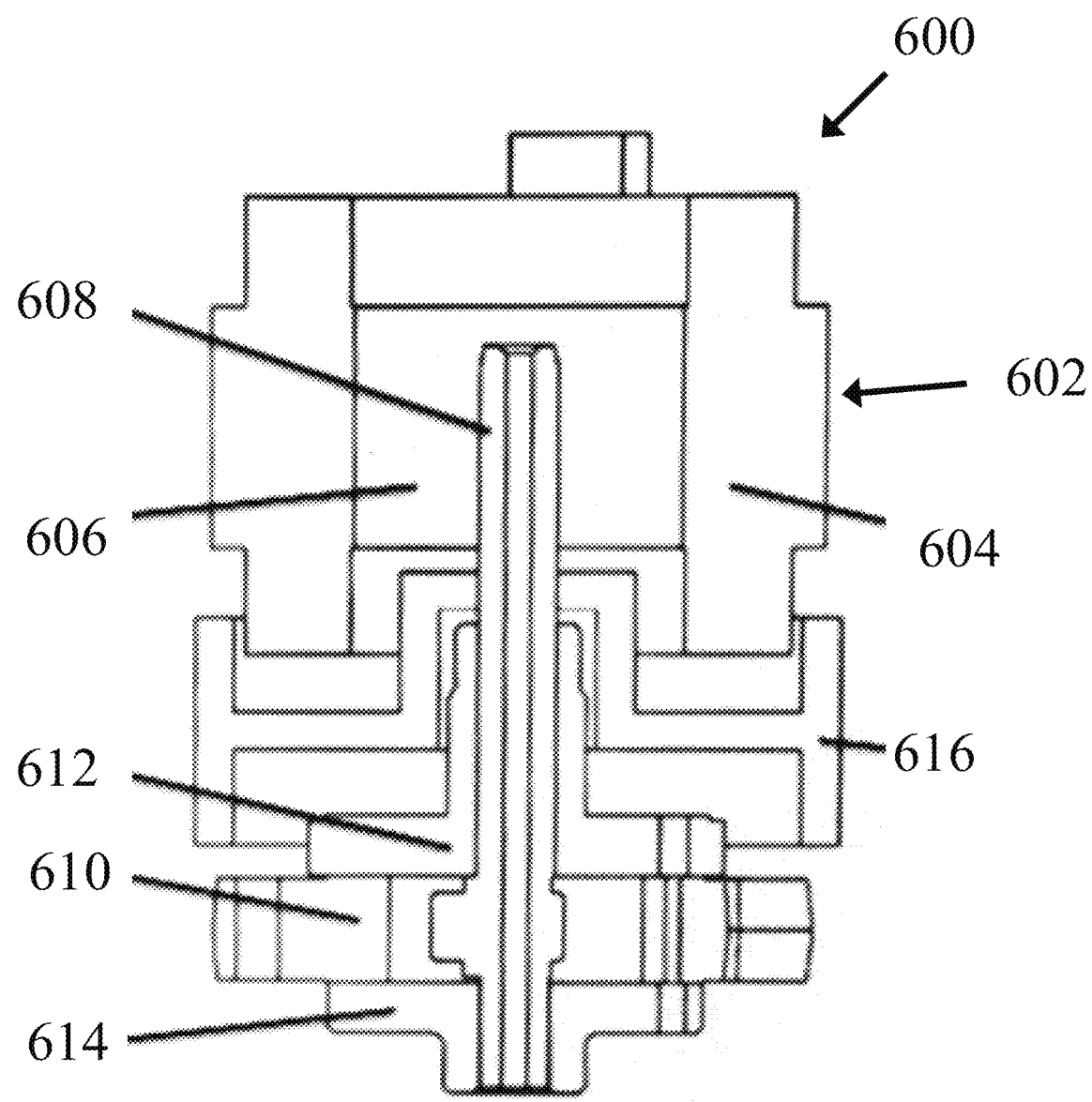
FIG. 6 is a schematic representation of a rotary compressor according to some embodiments.

FIG. 6 depicts yet another embodiment of a rotary compressor 600. Similar to the embodiments described above in connection with FIGS. 4-5, the compressor includes a motor 602 including a stator 604 and a rotor 606 electromagnetically coupled to the stator. A shaft 608 is coupled to the rotor 606 and extends through a compressor cylinder 610, as well as upper and lower flanges 612 and 614 attached to the cylinder 510. However, in this embodiment, a flywheel 616 is coupled to the rotor 608 and located between the upper flange 612 and the motor 602.

Figure 7:
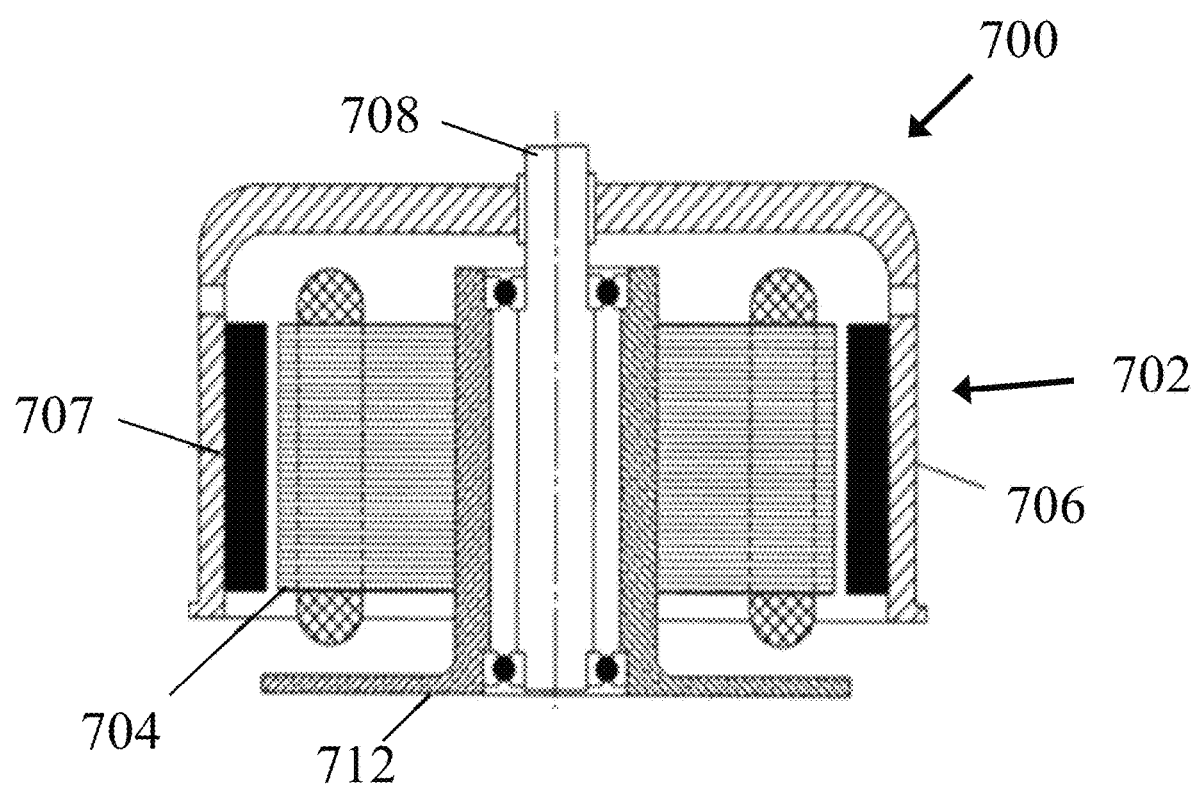
FIG. 7 is a schematic representation of a rotary compressor according to some embodiments.

In the embodiments depicted in FIGS. 4-6, the motors 402, 502, and 602 are interior-rotor-type motors (in which the stator surrounds the rotor) as in typical BLDC motors that have been used in rotary compressors. However, other configurations also may be suitable. For example, FIG. 7 depicts a portion of a rotary compressor 700 according to one embodiment that includes an exterior-rotor-type motor 702 in which the rotor 706 is located around the stator 704. For example, the rotor may be shaped as a cup to facilitate attachment to a shaft 708 as well as mounting of magnets 707 to the interior of the rotor which electromagnetically couple the rotor to the stator 704. The exterior location of the rotor 706 effectively increases the moment of inertia of the rotor, and thus the rotor may function as a flywheel. In some embodiments, additional mass may be added to the rotor and/or a separate flywheel may be coupled to the rotor to further increase the moment of inertia as desired. Similar to the embodiments described above, the rotor 706 is coupled to a shaft 708 such that rotation of the rotor drives rotation of the shaft. The shaft extends through an upper flange 712 that is attached to a compressor cylinder (not depicted).

Although certain arrangements of rotary compressors and motors have been described above in connection with FIGS. 4-7, it should be understood that other arrangements may be suitable. For example, the flywheel configurations depicted in FIGS. 4-6 may be combined with an exterior-rotor-type motor as shown in FIG. 7. In some embodiments, other variations of flywheel assisted rotary compressors may vary in terms of where the compressors and/or flywheels are installed and/or what types of motor configurations used (e.g., interior-rotor-type motors or exterior-rotor-type motors). Depending on the particular embodiment, the flywheels may be shaped and sized to be incorporated inside a rotary compressor at relatively low cost compared to using expensive BLDC drive electronics, especially since the addition of flywheel can significantly lower the cost of the BLDC drive or eliminate the BLDC drive altogether, and/or allow a single cylinder compressor behave and perform much like a twin cylinder compressor but have lower manufacturing cost.

Depending on the particular embodiment, the size, shape, and/or weight of a flywheel may be selected to provide one or more desired performance characteristics for a rotary compressor. For example, in some embodiments, the flywheel may be sized and shaped to provide a desired decrease in the amplitudes of drive torque ripples relative to a compressor that does not include the flywheel. In some instances, the decrease may be at least 50%, at least 60%, at least 70%, less than 80%, less than 70%, and/or less than 60%. In one embodiment, a reduction in the amplitude of drive torque ripples may be about 70%.

In some embodiments, the increased moment of inertia from the flywheel may reduce the amplitude of rotational vibrations relative to a compressor that does not include a flywheel. For example, the reduction in rotational vibration amplitude may be at least 80%, at least 90%, or more (e.g., about 92%). In some instances, the reduction in amplitude of rotational vibrations due to the flywheel may enable a single cylinder rotary compressor to exhibit a rotational vibration amplitude similar to that of a twin cylinder rotary compressor, which inherently has lower amplitude rotational vibrations as discussed above.

EXAMPLES

Additional details of the role of the flywheel are described in more detail below. In the following examples, the Kinetic Energy (KE) stored in a flat disk flywheel with radius $R_1$ and a center hole with a radius of $R_2$, thickness of H, and running at a frequency of F Hz is: $KE = \frac{1}{2} I \omega^2$, where $I_f$=Moment of Inertia of the flywheel=$\frac{1}{2} M(R_1^2 + R_2^2)$ for a Flat disk; $M_f$=Mass of the flywheel=$\rho \pi (R_1^2 - R_2^2)H$; $\rho_f$=Density of the flywheel material (e.g., 0.28 lb/in³ for iron or 0.31 for Brass); $\omega = 2\pi F$; and F=rotation/sec.

For a commercially available single-cylinder rotary with a diameter of 4 inches, height of 9 inches, and weight of 19 lbs, for example, used in an inexpensive window air conditioner producing 12,000 Btu/hour (3,516 W) of cooling, the electrical power input to the compressor is ~760W, i.e., 760 Joules/sec. Because it is used in an inexpensive air conditioner, the compressor cost/price has to be relatively low, and thus a single cylinder rotary compressor is used which has inherently high vibration amplitudes and high levels of noise, especially in the low frequency range related to the pressure load variation during each cycle. Such a compressor typically includes a relatively expensive and complicated inverter drive to modulate the speed to follow the cooling load for high efficiency. However, the inventors have appreciated that it would be desirable to modify the design of the single cylinder compressor to have the low vibration amplitudes and sound levels equal to or better than more expensive twin cylinder rotary compressors, but without increasing the combined cost/price of the compressor/drive.

Assuming that motor electrical efficiency is 85%, the mechanical energy transferred from the motor to the pump assembly during each compressor cycle operating at 100 Hz is 6.46(=760×0.85/100) Joules.

In the housing of the above 1 HP conventional rolling piston BLDC compressor, there is sufficient room to install a flywheel that will do the job satisfactorily, specifically between the upper flange and the motor.

Figure 8:
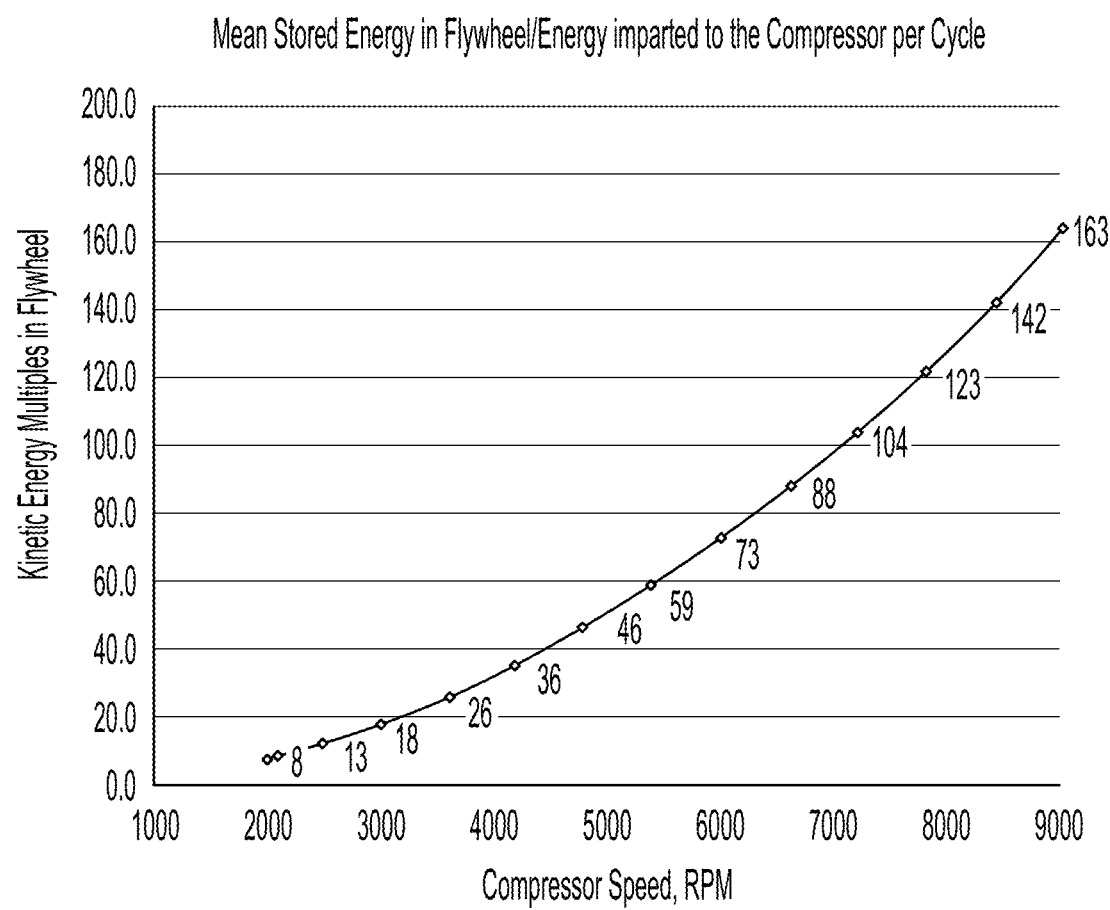
FIG. 8 is a graph of the kinetic energy stored in a flywheel according to one example.

A simplified embodiment of the flywheel in accordance with the configuration of FIG. 5 is described below. The flywheel consists of a thin disk with the dimensions of: $R_1$=1.875 in, $R_2$=0.25 in, H=0.025 in, $\rho$=0.31 lb/in³ for brass and a thin cylinder shaped ring with the dimensions of: $R_1$=1.875 in, $R_2$=1.625 in, H=1.528 in. The thin disk represents the hub at the center. In order to maximize the moment of inertia for a fixed total flywheel mass of 2.75 lbs, most of the mass (e.g., 2.67 lbs) is placed at the outer perimeter in the form of a cylindrical ring. The cylindrical ring represents the peripheral thin cylindrical mass of a one-piece flywheel shown in FIG. 5, in which the thin wheel in the middle is assumed to have the mass and moment of inertia of a center hub and spokes. FIG. 8 shows a graph of the total stored energy of this flywheel as a multiple of the kinetic energy to be transferred in each cycle at various rotational speeds. At a rotational speed of 33.33 Hz (2000

RPM), the kinetic energy stored in the iron disk is KE=38.4 lb-ft (52 Joules). Because of the relatively high kinetic energy stored in the flywheel compared to the average energy input into the compressor per cycle (approximately 52/6.46=8.1 times), the rotational speed of the compressor will be quite uniform within +/−0.1% and steady throughout the cycle. The driving torque is also quite uniform within +/−0.1%, nearly constant despite the fact that the load torque fluctuates from near zero in the start of compression cycle to the peak value at the end of the compression cycle as illustrated in FIG. 1. At higher speeds greater than 2000 RPM, the multiples of per cycle kinetic energy stored in the flywheel increases exponentially to reach close to 73 at 6000 RPM. With the flywheel installed in the rotary compressor, it can be assumed that the electric motor is supplying the 6.46 Joules of kinetic energy during each compressor cycle into the flywheel at an approximately constant rate (i.e., the supplied current is approximately constant over the cycle and the driving torque is also approximately constant). The flywheel, in turn, dispenses the energy required by the compressor from the large total stored kinetic energy as needed, instantaneously responding to precisely match the load torque required by the compressor over the course of each cycle.

Next, the speed variation of a flywheel as a result of cyclic energy transfer from the flywheel to a compressor pump assembly over each compressor cycle is analyzed in more detail. First, the coefficient of speed fluctuation ($C_f$) is defined as:

$$C_f=(\omega_{max}-\omega_{min})/\omega_{avg}=2(\omega_{max}-\omega_{min})/(\omega_{max}+\omega_{min}).$$

The kinetic energy ($K_e$) transferred from the flywheel to compressor per compressor cycle is defined as:
$K_e=I_m\omega_{avg}^2 C_f$, where the moment of inertia ($I_m$) of the compressor's rotating parts including the flywheel is:

$$I_m=K_e/(C_f\omega_{avg}^2).$$

The torque (T) during a cycle is:

$$T=I_m\omega,$$

Where the angular speed ($\omega$) is:

$$\omega=\omega_{avg}(1+/-C_f \sin \theta/2) \text{ with } \theta \sim \omega_{avg} t.$$

The amplitude of speed variation over a cycle is $\omega_{avg}C_f/2$. The driving torque ($T_d$) transmitted to the compressor's rotating parts by the motor is:

$$T_d=I_m\omega_{avg}(1+/-C_f/2, \text{ and}$$

The average total kinetic energy ($K_E$) stored in the flywheel and other rotating components of the compressor is:

$$K_E=I_m\omega_{avg}^2.$$

The above set of equations describe the influence of the moment of inertia (MOI) for the flywheel and other rotating components of the compressor as follows. During each compressor cycle, the flywheel and the compressor will rotate at the average speed of ωavg. When the kinetic energy $K_e$ is fully imparted to the compressor to execute the compressor cycle, the flywheel speed slows to the minimum speed, $\omega_{min}$. When the motor replenishes the energy to the flywheel, the flywheel speed increases to the maximum, $\omega_{max}$. For direct-driven electrical machinery, a recommended $C_f$ value is 0.002. In other words, so long as the flywheel's MOI is large enough to limit the amplitude of speed variation of a rotating machinery within +/−0.1% of the average rotating speed, i.e., $C_f$ value less than 0.002, electrical machinery such as a refrigeration compressors directly driven by a motor such as synchronous motor will operate smoothly without losing the synchrony while maintaining peak efficiency. From the expression for the driving torque above, this also means that the torque variation is also within 0.1% of the average torque, which in turn means the current requirement for the motor is within 0.1% of the average current, which is usually within the resolution of a typical power source. In view of the above, by utilizing a suitably sized flywheel within the compressor, a BLDC drive would only be required to supply practically constant current, rather than needing to dynamically adjust the current supplied to the motor.

Figure 9:
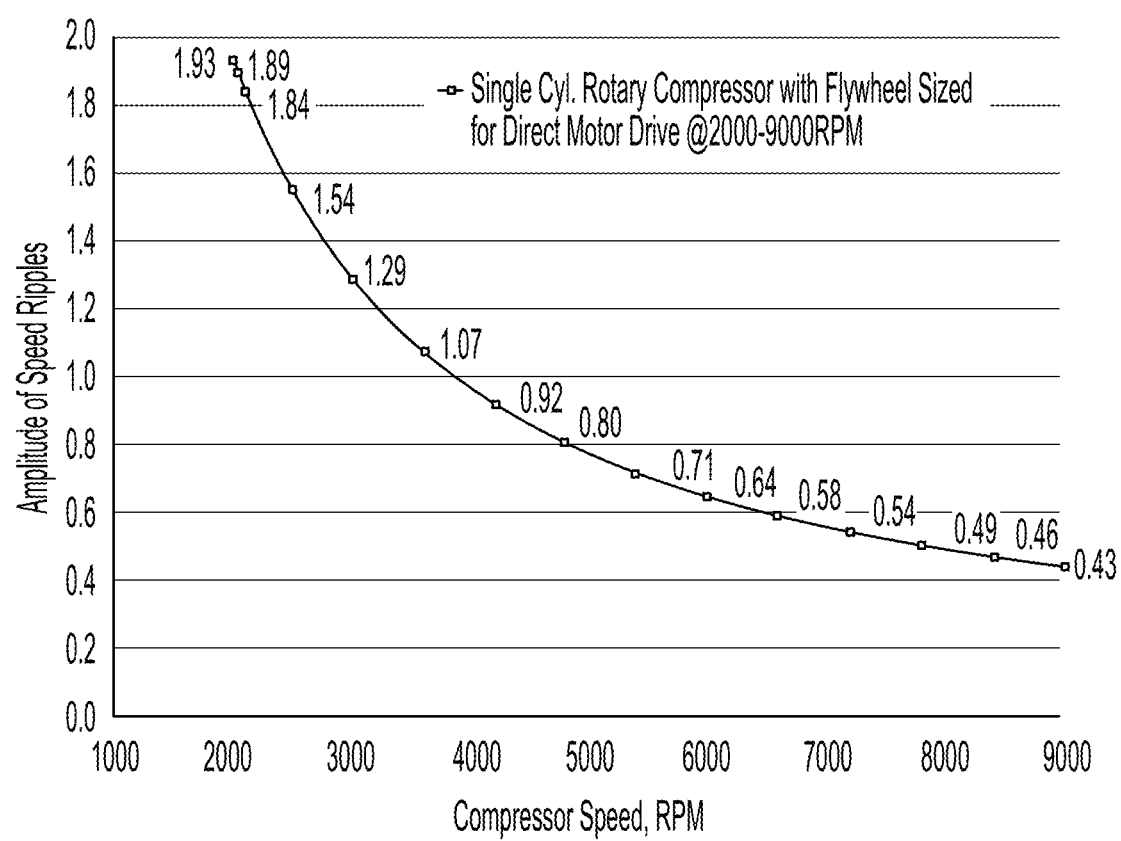
FIG. 9 is a graph of the amplitude of speed ripples in a single cylinder rotary compressor according to one example.
Figure 10:
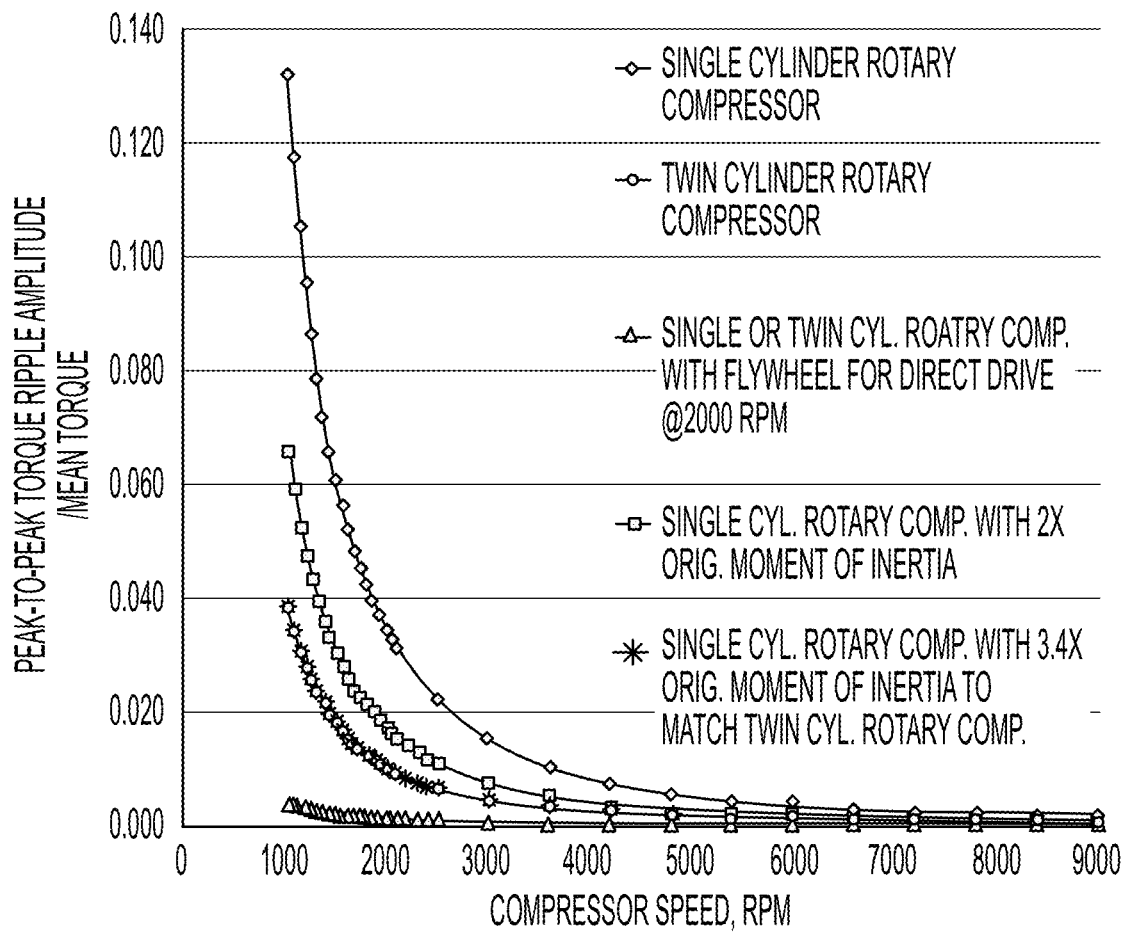
FIG. 10 is a graph of peak-to-peak torque ripple amplitudes of single and twin cylinder compressors according to one example.

FIG. 9 is a chart showing the projected speed variation for a 10cc displacement rotary compressor with a flywheel sized for direct motor drive, according to one example. This example satisfies the criterion described above for $C_f$ starting at 2000 RPM with an RPM amplitude variation of 1.93, meaning $C_f$ of 0.00193 (i.e., $C_f$ of less than 0.002). As the speed increases, the amplitude of speed variation becomes even lower reaching 0.43 RPM, meaning $C_f$ of only 0.00005, at 9000 RPM. These low levels of speed variation again result in a nearly constant electrical current input requirement into a BLDC motor during each revolution, thus obviating the need to constantly monitor the speed of the motor to determine the location of the rotor, and to adjust the supply current to the BLDC motor to match the rapidly changing current requirement to satisfy the torque required by the motor. FIG. 10 shows a graph of the peak-to-peak amplitudes of the torque ripples of a single and twin cylinder rotary compressors with and without flywheel as a function of RPM.

In view of the above, by introducing a suitably sized flywheel, (in this example a flywheel that weighs 2.75 lbs inside the 1 HP compressor that weighs about 19 lbs), the difficult task of torque matching by BLDC drive electronics can now be performed instantaneously, effortlessly, and mechanically by the flywheel's large stored kinetic energy. In particular, since the kinetic energy is large relative to the energy input required for each revolution (due to the flywheel's relatively high moment of inertia), the BLDC drive electronics, if there is a need to have one, is now required to only supply nearly constant current to the motor to supply and replenish the relatively small energy that the flywheel imparts to the compressor's pump assembly over each cycle. This practically uniform current supply requirement drastically simplifies the BLDC drive electronics and its firmware and lowers its complexity and cost significantly.

Moreover, if the flywheel is large enough, the complicated algorithms of a sensor-less vector sinusoidal BLDC drive may not be required. Instead, the BLDC drive only has to provide the required current to match the cooling load that may change over time as the temperature of a room slowly changes or refrigerator reaches its steady state target temperature when the compressor is used in an air conditioner or refrigerator, respectively. Accordingly, the BLDC drive electronics would not be required to instantaneously match the torque during each cycle. As a result, the high cost FETs, high performance chips, microprocessors to compute the fast changing speed variations, torque, etc. within each cycle may not be required. Indeed, in some embodiments, all that may be required is a variable frequency DC to DC converter that can change frequency but without the complex and high speed computing algorithms of BLDC drive such as sensorless, vector drive with torque compensation.

In some embodiments, the only requirement may be feedback from the environment to adjust or turn on the compressor (e.g., via a startup capacitor). Alternatively or additionally, if power to the compressor is coming from an AC source, a line-start synchronous motor, as known to those of skill in the art, may be utilized. Such synchronous motors can be designed to operate on three, multi-phase or even a single phase AC power. These approaches may significantly reduce the cost of BLDC rotary compressor systems, especially when there is no need to change the speed of the motor, which happens in many cases. If there is a need to change the speed, then inverters may be utilized to vary the frequency of the AC power input to the motor but without the costly and complicated motor speed and location sensing BLDC drive electronics.

The above conclusion regarding the simplification of the BLDC drive electronics or potential elimination for fixed speed applications as a result of the introduction of an inexpensive, moderately sized flywheel is but one of the benefits of having the flywheel assisted rotary compressor. As discussed below, the inventors have appreciated that a flywheel also may be beneficial when incorporated in twin-cylinder rotary compressors.

As noted above, despite the many refinements in modern BLDC drive compressors with near perfect torque matching for a single cylinder rotary compressor, noise and vibration inherent in single rotary compressors may still result in unacceptable levels of rotational vibrations and/or noise. Since these torque vibrations are closely related to the operating speed, the frequency of vibration is relatively low and difficult to control in a refrigeration or air conditioning system as practitioners of the refrigeration system. To reduce these vibration and noise problems, the rotary compressor industry had introduced much more complicated and expensive twin-cylinder rotary compressors which, which as discussed above, have two compression chambers on a single shaft operating 180 degrees out of phase to largely cancel out the first harmonic torque peaks, thereby resulting in much lower vibration (e.g., by a factor of ~13), and lower noise compared to single cylinder rotary compressors. However, in moving to twin-cylinder compressors, the price of the rotary compressors increased even higher compared to the inexpensive AC driven reciprocating compressors due to the fact that the BLDC electronics is expensive (which AC driven reciprocating compressor do not need), and the twin cylinder parts are much more expensive than single cylinder compressor parts that are already much more expensive than those of reciprocating compressors to begin with.

For both single- and twin-cylinder rotary compressors, the BLDC drive electronics in general, constitute as much as 25 to 35% of the total materials cost. Because the cost of the BLDC drive is such a major portion of the total materials cost, it will be quite desirable to significantly reduce the cost of the BLDC electronics to reduce the cost of a rotary compressor. Therefore, a major reduction of cost of BLDC drive electronics (or especially the elimination of a BLDC drive) for majority of applications is a very economically and commercially attractive concept for both single cylinder and twin cylinder rotary compressors as described above.

Figure 2:
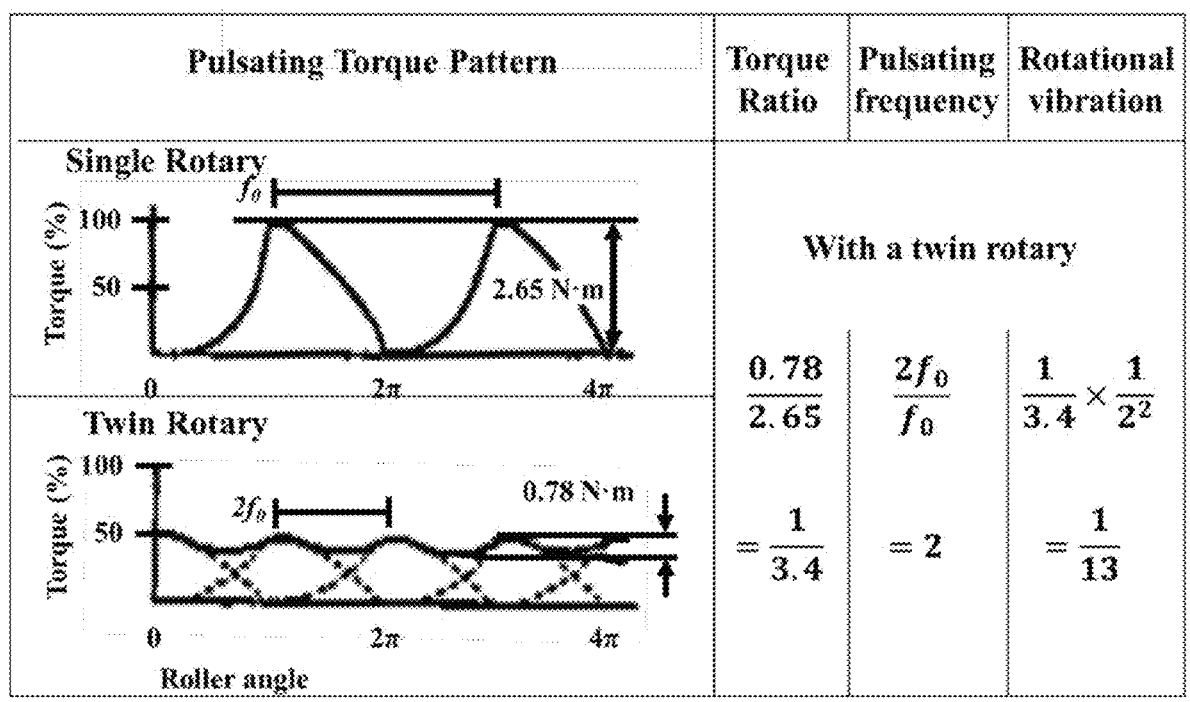
FIG. 2 illustrates the amplitude and frequency of torque ripples and rotational vibration for single and twin cylinder rotary compressors.
Figure 3:
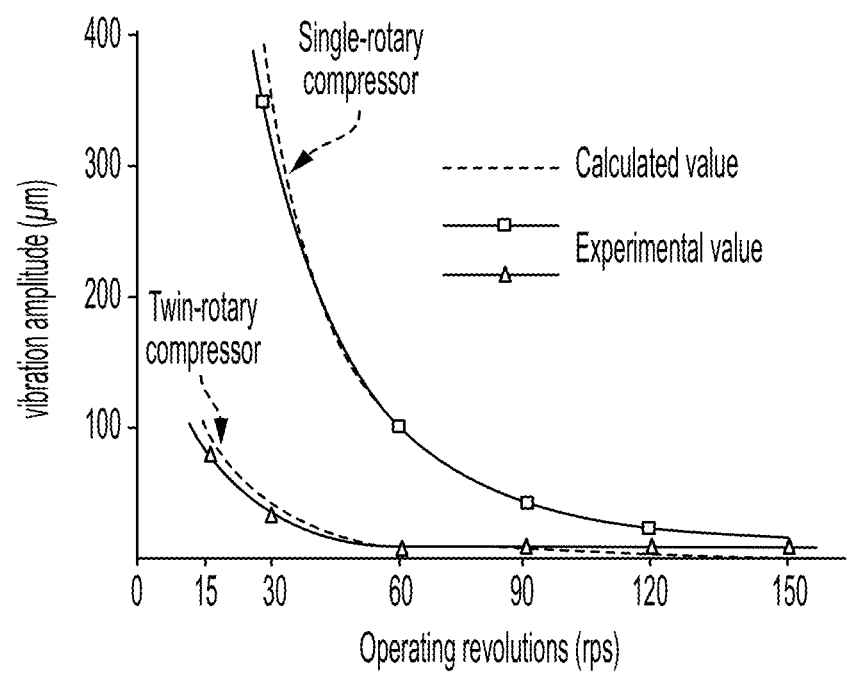
FIG. 3 is a graph of a comparison of vibration amplitudes for single and twin cylinder compressors.

With respect to twin-cylinder compressors, because of the balancing effect of the two out-of-phase twin cylinders (FIG. 2), the amplitude of torque fluctuations in a twin cylinder compressor is only ~30% that of a single cylinder compressor, and the frequency of the torque fluctuations is double the operating frequency. Consequently, in order to further smooth out the torque fluctuations and the speed fluctuations within 0.1% of the mean speed over a cycle at the lowest operating speed by including a flywheel in a twin cylinder rotary compressor, it would take less than 30% of the total moment of inertia within the rotary compressor compared to that for the single cylinder rotary compressor. Thus, in a twin cylinder compressor with 10cc displacement and a weight of 19 lbs, a flywheel weighing well less than 1 lb would be suitable. Even with such a modestly sized flywheel in a twin cylinder rotary compressor, its BLDC drive will be also supplying a fairly uniform current over a compressor cycle that only varies slowly with the changes of load or the set point. Accordingly, just like with a single cylinder rotary compressor, but with a much smaller and more moderately sized flywheel, the complexity and cost of BLDC drives for twin cylinder rotary compressors may be decreased significantly, making such compressors more cost competitive in more applications. Also, if the application of interest does not require changes in the speed compressor speed, twin cylinder rotary compressors with a suitably sized flywheel can be equipped with line-start synchronous motors without the BLDC drives, resulting in significant reduction in cost by as much as 25 to 35% (i.e., the relative cost of the BLDC drive).

In view of the above, incorporating a flywheel in a single or twin cylinder rotary compressor may enable smoothing or steadying of the rotational motion the compressor, thereby allowing the compressor to operate with nearly uniform torque and current throughout a revolution. Such arrangements may have numerous benefits. For example, the BLDC drive may be significantly simplified, reduced in size, and/or eliminated, thereby allowing for fixed speed operation from an AC power source. Additionally, significant reduction of electrically and mechanically induced noise and vibration of the single cylinder rotary compressor may be achieved, e.g., down to or below levels currently achieved by state-of-the-art twin cylinder rotary compressors. In some instances, incorporation of a flywheel may permit better instantaneous load following capability by the flywheel to match compressor's loads compared to state-of-the art BLDC drive/rotary compressor combinations, much lower amplitude rotary vibration as a reaction to each loading and unloading cycle of the compressor due to the higher moment of inertia, and/or extremely low mechanical energy loss due to the near perfect and instantaneous torque transfer between flywheel and the compressor pump assembly. Additionally, higher electrical efficiency of the motor may be achieved due to quasi-steady state current that slowly changes over a longer time span (e.g., minutes and seconds) related to the environment/load temperature change rather than within each cycle (e.g., milliseconds) to instantaneously match the load torque.

Additionally, in some embodiments, a flywheel assisted rotary compressor may result in significantly reduced loss of energy due to lower rotational vibration of the compressor. In particular vibrational energy may be captured and stored in the flywheel to be used constructively to supply the energy into the compressor. As noted above, in some instances, such compressors may achieve higher overall electrical and mechanical efficiencies compared to conventional rotary compressors, and may have much lower cost BLDC drive components (and as discussed previously, if the moment of inertia added by the flywheel is large enough, the BLDC drive may be eliminated altogether if the motor can be started and guided into synchrony). Moreover, in some embodiments, the performance characteristics (e.g., vibration and noise levels, motor cogging, electrical efficiency, cost, etc.) of a flywheel assisted single-cylinder rotary compressor as described herein may match or exceed those of conventional twin-cylinder compressors.

With its expected lower cost and myriad advantages of extremely low noise and vibration, compactness, high efficiency, high cooling power density, a flywheel assisted rotary compressor with a suitably sized flywheel as described herein (e.g., single cylinder and/or twin cylinder configurations) may be especially useful for refrigeration systems where there is an increasing demand from regulating agencies and end users for lower cost, higher efficiency, low acoustic signature, and lower vibration systems. Example applications include household appliances such as refrigerators, countertop water coolers and icemakers, compact room dehumidifiers, personal air conditioners, smart distributive heating and cooling systems in smart homes, and laser cooling systems among others. It may also be beneficial to incorporate similar flywheels into air compressors and engines of various kinds inside the casing. For example, for compressor applications involving very high compression ratios (such as natural gas compressors that need to compress 10 psi into 1000 psi) where torque ripples become exceedingly high and the noise and vibration can be very difficult to control, flywheel assisted rotary compressors may be especially beneficial. Moreover, in mass production, these extremely beneficial flywheel assisted rotary compressors may be inexpensive due to their compact sizes, low materials cost, and simple and inexpensive manufacturing methods. This may allow them to be used in many applications such as air compressors, gas compressors for natural gas, nitrogen, helium, argon, etc. and refrigeration compressors used in household refrigerators, countertop appliances, and many others such as distributed super-efficient compact cooling systems that require extremely low noise and vibration while performing at very high overall energy efficiency.

While certain embodiments have been described herein in connection with rolling piston compressors, it should be understood similar flywheel arrangements may be effective in other rotary compressors such as rotating vane compressors, scroll compressor, screw compressors, swinging compressors, etc.

It should be understood that the foregoing description is intended merely to be illustrative thereof and that other embodiments, modifications, and equivalents are within the scope of the present disclosure recited in the claims appended hereto. Further, although each embodiment described above includes certain features, the present disclosure is not limited in this respect. Thus, one or more of the above-described or other features or methods of use, may be employed singularly or in any suitable combination, as the present disclosure and the claims are not limited to a specific embodiment.

What is claimed is:

1. A rotary compressor comprising:
   a motor having a rotor and a stator electromagnetically coupled to one another, wherein the rotor at least partially surrounds the stator and is rotatable relative to the stator, wherein the rotor includes an additional mass configured to store kinetic energy during a compressor cycle to provide an amplitude of speed variation for rotating components of the rotary compressor and a torque variation within 0.1% of a mean rotating speed and torque, respectively, over the compressor cycle;
   a single compressor cylinder; and
   a shaft rotatably coupled to the rotor and extending through the single compressor cylinder, wherein rotation of the rotor drives rotation of the shaft within the single compressor cylinder.

2. The rotary compressor of claim 1, wherein the rotor is shaped as a cup around the stator.

3. The rotary compressor of claim 1, wherein the additional mass is configured to reduce rotational vibration of the rotary compressor relative to a compressor that does not include the additional mass.

4. The rotary compressor of claim 1, wherein the motor is configured to be driven by an alternating current power supply without a BLDC drive.

5. The rotary compressor of claim 1, wherein the motor is a BLDC motor controlled by a BLDC drive configured to provide approximately constant current to the motor during the compressor cycle.

6. The rotary compressor of claim 1, wherein the rotary compressor is one of a rolling piston compressor, a rotating vane compressor, a swing compressor, or a scroll compressor.

7. The rotary compressor of claim 1, further comprising a casing, wherein the motor, the single compressor cylinder are located within the casing.

* * * * *